(12) United States Patent
Rickert

(10) Patent No.: US 7,159,378 B2
(45) Date of Patent: Jan. 9, 2007

(54) DRIVE TRAIN FOR A HEADER OF A HARVESTING MACHINE

(75) Inventor: Clemens Rickert, Stadtlohn (DE)

(73) Assignee: Maschinenfabrik Kemper GmbH & Co KG, Stadtlohn (DE)

( * ) Notice: Subject to any disclaimer, the term of this patent is extended or adjusted under 35 U.S.C. 154(b) by 122 days.

(21) Appl. No.: 10/760,782

(22) Filed: Jan. 20, 2004

(65) Prior Publication Data

US 2004/0187461 A1 Sep. 30, 2004

(30) Foreign Application Priority Data

Jan. 24, 2003 (DE) .............................. 103 02 694.0

(51) Int. Cl.
*A01D 34/03* (2006.01)
(52) U.S. Cl. ........................................ 56/13.5; 56/15.1
(58) Field of Classification Search ................. 56/10.8, 56/13.5, 14.5, 15.1, 16.4 R, 51
See application file for complete search history.

(56) References Cited

U.S. PATENT DOCUMENTS

| 2,245,448 | A | * | 6/1941 | Simpson | 56/10.3 |
| 3,535,859 | A | * | 10/1970 | Adams | 56/10.4 |
| 3,675,404 | A | * | 7/1972 | Izakson | 56/209 |
| 3,760,575 | A | * | 9/1973 | Moore | 56/370 |
| 3,945,175 | A | * | 3/1976 | Barkstrom et al. | 56/10.8 |
| 4,055,037 | A | * | 10/1977 | Oosterling et al. | 56/16.4 R |
| 4,151,700 | A | * | 5/1979 | Gardella | 56/13.7 |
| 4,166,351 | A | * | 9/1979 | Nienberg | 56/192 |
| 4,185,445 | A | * | 1/1980 | van der Lely | 56/6 |
| 5,433,064 | A | * | 7/1995 | Schmitt et al. | 56/6 |
| 5,778,644 | A | | 7/1998 | Keller et al. | 56/11.2 |
| 6,035,619 | A | * | 3/2000 | Loehr | 56/13.6 |
| 6,370,853 | B1 | | 4/2002 | Randall et al. | 56/14.2 |
| 2002/0189887 | A1 | | 12/2002 | Baxter, Jr. | 180/376 |

FOREIGN PATENT DOCUMENTS

| DE | 2124341 | | 11/1972 |
| DE | 34 31 549 C1 | | 3/1986 |
| DE | 3512619 A1 | * | 10/1986 |
| DE | 4008538 A1 | | 9/1990 |
| DE | 199 18 550 A1 | | 10/2000 |
| EP | 0063531 | | 7/1985 |

* cited by examiner

*Primary Examiner*—Thomas B. Will
*Assistant Examiner*—Alicia Torres

(57) ABSTRACT

A drive train for a header of a harvesting machine comprising a variable length drive shaft. The variable length drive shaft has a first end having a first hinged connection which is connected via a drive element with a first shaft. The variable length drive shaft has a second end having a second hinged connection that is operatively coupled to a driven element in driving connection with a drive shaft of the header. The drive shaft drives harvesting elements of the header. A connection element is arranged to align the drive element and the driven element at least approximately parallel to each other.

9 Claims, 4 Drawing Sheets

DRIVE TRAIN FOR A HEADER OF A HARVESTING MACHINE

FIELD OF THE INVENTION

The present invention is directed to a drive train for a header of a harvesting machine, comprising a variable length drive shaft, which has a first end with a hinged connection connected via a drive element with a first shaft and a second end with a second hinged connection that can be brought via a driven element into a driving connection with a drive shaft of the header.

BACKGROUND OF THE INVENTION

In the prior art, cutting systems for combines are usually driven by drive shafts, which extend between a header drive shaft, which is coupled to the lower feeder house roller, and one or both lateral ends of the header, i.e., essentially perpendicular to the direction of travel (see DE 199 18 550 A). Telescoping drive shafts are used if the cutting system is to complete a pendulum motion about a horizontal axis in the direction of travel on its suspension on the feeder house. Before the cutting system can be separated from the combine for transport, the drive shaft is manually removed from the feeder house and reattached before receiving another header, which represents a significant expense of time.

A few types of headers, particularly for harvesting corn, are provided with side parts, which can swing upwards into a transport position and which are hinged at a center part. For these headers, usually a drive shaft that can telescope extends between the header drive shaft of the feeder house and the outer edge of the center part. The drive shaft drives a drive shaft of the center part, which is in drive connection with the individual feeding and picking devices. The drive shafts of the side parts are connected, in turn, through releasable couplings to the drive shaft of the center part. When the outer parts are swung upwards, the couplings are automatically decoupled. They automatically couple again when the parts are swung down. Due to the rather small amount of available space, particularly for swinging headers, which are attached to a combine with suspension equipment, it can be considered a disadvantage that the drive shaft must provide a relatively large area for change in angle and length. Therefore, rather complicated and cost-intensive drive shafts are required, which are exposed to rather significant wear and tear due to the large changes in angle.

For other embodiments, the feeder house is coupled by short shafts to releasable couplings of the header, which are connected to drive shafts. The drive shafts drive the side parts, which are in turn in drive connection through other releasable couplings with the driven devices of the center part. When the side parts are swung upwards, the couplings are automatically separated. However, such headers cannot execute a pendulum motion. In turn, for other embodiments, a drive shaft that can telescope is provided between the feeder house and the outer sides. This does enable a pendulum motion, but requires manual removal of the drive shaft before the side parts can be moved into the transport position.

A drive train for the row units of a corn picker are described in U.S. Pat. No. 6,370,853 B. An angular gear, from which a shaft extends forwards to the corn picker, is attached to an output shaft attached to the front side of the feeder house and extending perpendicular to the direction of travel of the combine. There it drives a shift transmission via an angular gear. The shift transmission, in turn, drives the main drive shaft running perpendicular to the direction of travel via an angular gear hinged to the picker so that it can swing and a shaft extending in the direction of travel for driving the row units. Pendulum motion of the corn picker on the feeder house is not mentioned and would also not be possible due to the gear arrangement.

SUMMARY OF THE INVENTION

It is an object of the present invention to provide an improved drive train for a header.

The drive train comprises a telescoping drive shaft having a first drive connection. The first drive connection can be coupled to a first shaft via a drive element. The first shaft is mechanically coupled to an engine of a combine; however, it could also be driven by a hydraulic or electric motor. The second end of the telescoping drive shaft is provided with a second drive connection, which is operatively coupled to a drive shaft of the header via a driven element. The drive shaft drives the harvesting devices of the header, which may include feeding and picking devices, feeding drums, a cross auger, a reel, and/or a cutter bar. If the header is attached to the harvesting machine so that it can swing (i.e., about an axis extending in the direction of travel) or that can move in some other way, relative to the harvesting machine, the length of the extendible drive shaft changes. In addition, the angle between the first shaft and the drive shaft of the header also changes. So that the universal drive connections of the drive shaft do not have to receive the entire traversed angle range, it is proposed that a means is provided which aligns the drive element and the driven element for such angle changes at least approximately parallel.

This prevents large bending angles on the drive shaft, so that a compact structure of the drive train can be realized. Also, for large pivot angles and/or other movements between the header and harvesting machine, the use of complicated, cost-intensive, and large wide-angle drives in the drive shaft is eliminated.

In a illustrated embodiment, the drive element and the driven element are supported so that they can each rotate in a corresponding holder and the holders are coupled to each other by a connection device. This has the effect that the holders and thus the drive and driven elements are always aligned to each other at least somewhat parallel. Because the drive shaft can change in length, it is proposed also to shape the connection device so that it can change in length.

For headers that can move or be adjusted relative to the harvesting machine during harvesting operation, in addition to the change in distance between the drive element and the driven element, a rotational movement of the second holder relative to the first holder above the longitudinal axis of the drive shaft is also possible. The connection device is preferably suitable for receiving this rotational movement. For this purpose it can be configured so that it can rotate and/or twist.

In the case of a relative movement between the header and the harvesting machine, the driven element, as explained above, can rotate relative to the drive element through a certain range of angles. So that the connection devices can be aligned parallel to each other, it is advantageous if their holders are supported so that they can pivot about axes running perpendicular to the longitudinal axis of the drive shaft, the first holder is usually on the harvesting machine and the second holder on the header. These pivot axes preferably correspond to the axes about which the drive shaft also moves and which are defined by the motion of the header relative to the harvesting machine.

For example, if the header is suspended so that it swings on the harvesting machine, there is motion of the second holder relative to the first holder in the plane perpendicular to the longitudinal axis of the drive shaft, which preferably the connection device should also be able to complete. This enables the motion in a direction by the pivot axes of the holders mentioned above, which are defined, in turn, by the motion of the header relative to the harvesting machine. In the other direction, the motion of the connection device can be realized such that it is hinged so that it can rotate on two holders about an axis running perpendicular to the longitudinal axis of the drive shaft and perpendicular to the pivot axes of the holders.

In a illustrated embodiment, the connection device is configured as a two-part sleeve. The sleeve encloses at least the drive shaft, preferably also at least parts of the holders, which can be arranged in their corresponding housings. A first part of the sleeve is connected to the first holder, while a second part of the sleeve is connected to the second holder. The first and second part of the sleeve are coupled so that they can telescope and rotate relative to each other, so that the motions mentioned above can be performed.

It is proposed to attach the first shaft to the front side of the feeder house of a harvesting machine, e.g., on the feeder house of a combine or on the feeding channel of a field chopper. It usually extends horizontal and perpendicular to the direction of travel. Such a configuration of the first shaft also enables the invention to allow the drive shaft to extend in the direction of travel in a space-saving way. An angular gear is arranged between the first shaft and the drive shaft, which can enclose, e.g., conical gear wheels or a combination of a toothed wheel and a worm.

The drive shaft is attached in a known way to the header. Usually it is the main drive shaft extending over the width of the header, although also the use of an intermediate shaft between the driven element of the drive shaft and the shaft would be conceivable, which can extend in the direction of travel or another arbitrary direction. The driven element can be driven by the drive shaft or the intermediate shaft via arbitrary gears, e.g., a tee gear configuratlon with conical gear wheels, another drive shaft, or the like.

The header attached to the feeder house of the harvesting machine can be of arbitrary type, e.g., a corn cutter, corn picker, a pick-up, or a cutting system. The drive shaft can extend from the feeder house of the harvesting machine in the lateral direction, or diagonally forward, so that it is coupled to the edge region of a center part of a header, which is equipped with one or both side parts that can swing upwards (or move in some other way) into a transport position.

However, particularly for such headers, it is proposed to align the drive shaft at least approximately in the direction of travel or within a range of angles up to approximately 45° forward. This produces a compact arrangement of the drive shaft and a large possible range of pendulum angles, so that the header can also be used on combines or other harvesting machines with slope equipment. In this way, one also obtains the ability to provide the header in a construction with the drive train according to the invention for slope combines and in another construction, which is different only in that instead of the drive train according to the invention, a conventional drive shaft, which can possibly telescope, is used, for the use of combines or other harvesting machines without slope equipment.

DETAILED DESCRIPTION

Figure 1:
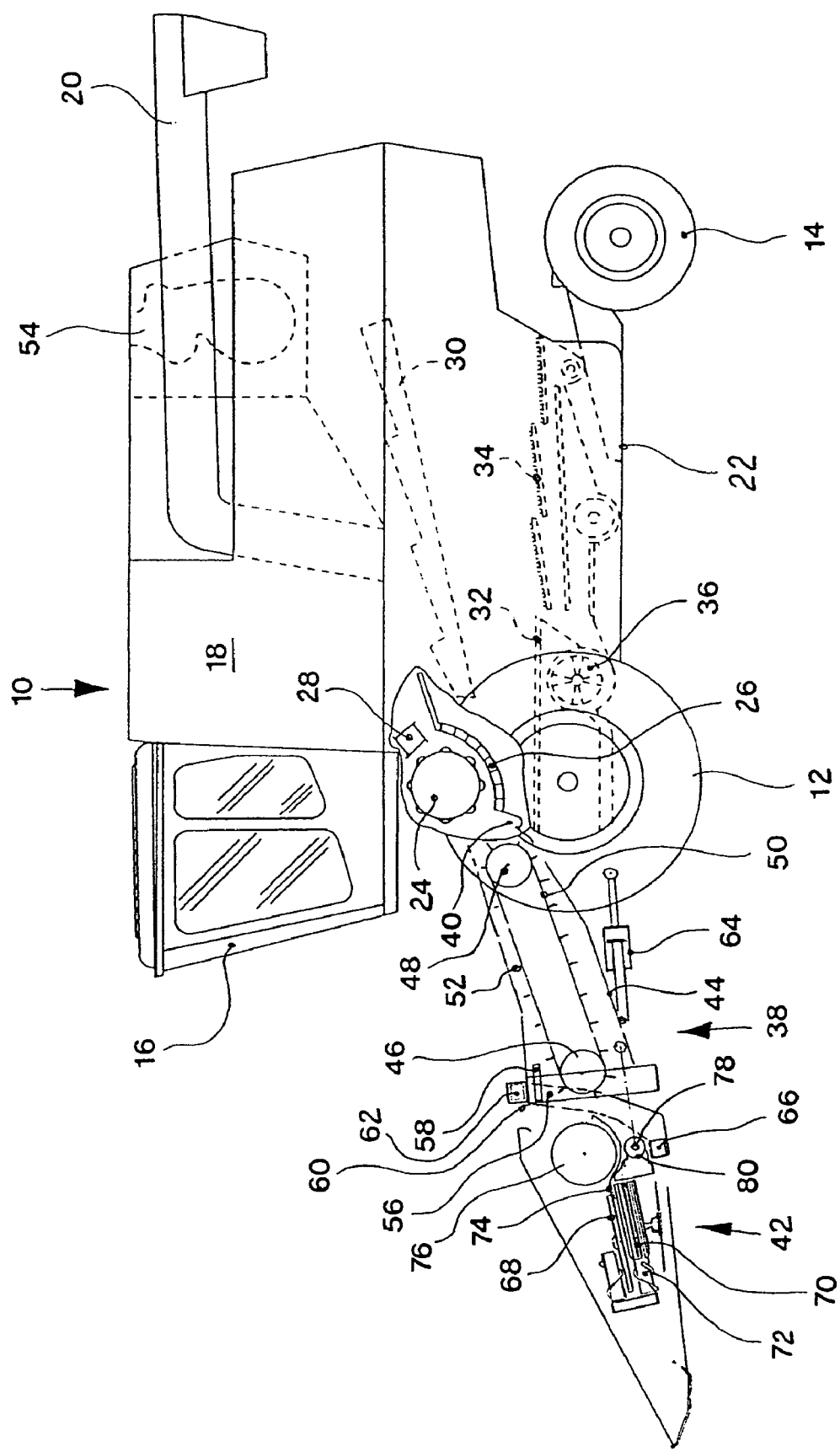
FIG. 1 is a schematic, partial cutaway side view of a combine having a header.

In the following description, the convention is used that directional information, such as forwards, backwards, and sideways, is relative to the direction of forwards travel of the harvesting machine. A harvesting machine shown in FIG. 1 in the form of a combine 10 is supported on front-wheel drive and rear-wheel steering wheels 12 and 14, respectively, and has a driver cabin 16, from which the machine can be operated by a driver. A grain tank 18 is located behind the driver cabin 16. The grain located in the grain tank 18 can be discharged therefrom by a discharge auger 20. The driver cabin and the grain tank 18 are supported on a frame 22. Harvested crop material is broken down into large and small components by a threshing assembly comprising a threshing cylinder 24, a threshing concave 26 and a beater 28. Trapped grain is separated from the threshed crop mat by a separating assembly comprising the illustrated straw walkers 30. The large non-grain crop components of the separated crop mat are expelled over the rear of the straw walkers 30 out the rear of the combine. Grain and chaff falling from the threshing assembly and the separating assembly are directed to a grain pan 32 and from the grain pan 32 to sieves 34. An air blast from the cleaning fan 36 blows the chaff from the sieves out the rear of the combine 10. The clean grain is collected on the floor of the combine and transported by elevators, not shown, to the grain tank 18.

A header 42 gathers crop material lying or standing on the ground and feeds the crop material to a feeder house 38 which feeds the crop material to the threshing assembly. The feeder house is provided with a stone catching trap 40. The feeder house 38 contains within its housing 44 a lower feeder house roller 46 and a top feeder house roller 48, around which the conveyor chain 50 with carriers 52 runs. The top feeder house roller 48 as well as the threshing assembly and separating assembly are driven by an internal combustion engine 54 in a known way.

At the front side of the feeder house 38 there is a so-called pendulum shield 56. The pendulum shield 56 is a rectangular frame, which is connected to the front side of the housing 44 of the feeder house 38 so that it can rotate about an approximately horizontal pivoting or pendulum axis 58 extending in the direction of travel. It is used as an attachment device, to which a frame 66 of the header 42 can be attached in a removable way.

Several holder elements 60 in the form of hooks projecting forward and upward are attached at the top side of the pendulum shield 56. A crossbeam 62 of the frame 66 of the header 42 also lies on the top side of the pendulum shield 56. The holder elements 60 prevent the crossbeam 62 of the header 42 from skidding forward from the pendulum shield 56. The header 42 is also connected to the bottom side of the pendulum shield 56 so that it can be detached by locking elements (not shown in the drawing).

The header 42 is supported on the feeder house 38 by the shield 56. The feeder house 38 can be pivoted about an axis running horizontal and perpendicular to the direction of travel, approximately coinciding with the axis of rotation of the top feeder house roller 48. The feeder house is pivoted by changing the length of a hydraulic cylinder 64, which extends between the lower front end of the housing 44 of the feeder house 38 and the frame 22.

The header 42 can be removed in a known way from the pendulum shield 56 by laying it down on a base, releasing the locking elements, and lowering the feeder house 38 farther reducing the length of the hydraulic cylinder 64, so that the holder elements 60 can be pulled backwards below the crossbeam 62. The header 42 is reattached in the reverse sequence.

The header 42 can be a corn picker as illustrated in FIG. 1. The corn picker comprises a series of feeding and picking units, which are supported on the frame 66, which is connected to the crossbeam 62. The header 42 has several feeding and picking devices, which are used for pulling in plants and for separating their cobs. The feeding and picking devices each include a feeding element 68, which can be set into rotation about an approximately vertical axis, as well as pairs of picking rolls 70 arranged underneath, each of which is equipped with augers 72 in their front region.

During operation, the feeding elements 68 grab plants standing in the field and guide them in interaction with the augers 72 into a picking gap. There, the plants are pulled downwards and the cobs are separated by means of the picking gap. The feeding elements 68 feed the grains to a cover 74 and a cross auger 76, which guides them to the center of the header 42. There they are expelled backwards through a center opening in the pendulum shield 56 and fed to the threshing assembly by the carrier 52 of the conveyor chain 50 of the feeder house 38.

The moving elements of the header 42 are driven by a transversely extending drive shaft 78 which drives the individual feeding and picking devices by associated angular gears 80.

Figure 2:
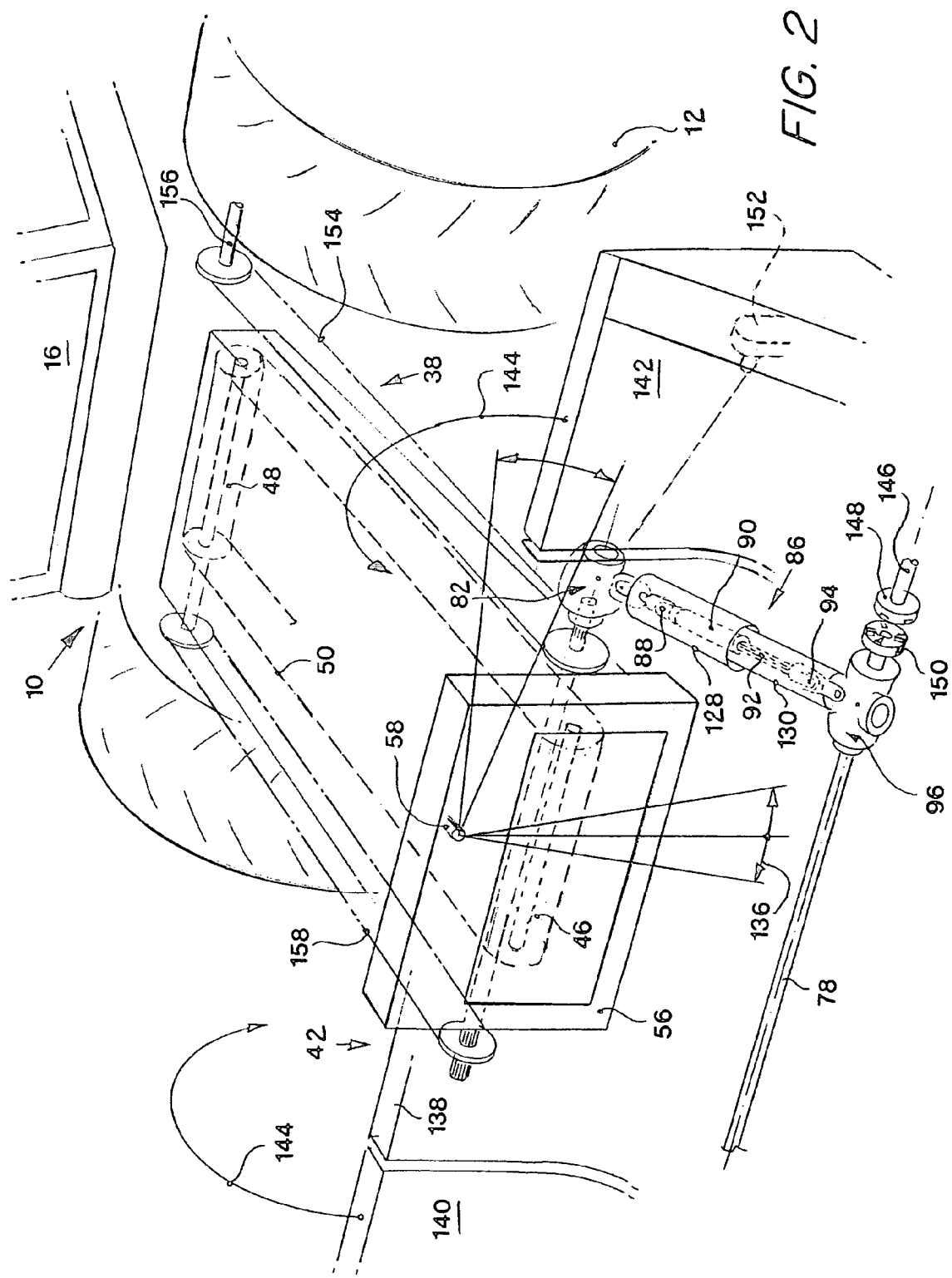
FIG. 2 is a perspective, schematic view of a drive train for the header from FIG. 1.

In FIG. 2, the drive train for the header 42 is shown in perspective. It includes a first angular gear 82 which receives a first shaft 84. The first shaft 84 is supported on and extends from the housing 44 of the feeder house 38. On the driven side, the first angular gear 82 drives a telescoping drive shaft 86, which extends in the direction of travel forward and diagonally downward from the first angular gear 82. The telescoping drive shaft 86 comprises a sleeve 90 with a non circular inner cross section and a rod 92 that can move in the axial direction in the sleeve 90 with an outer cross section corresponding to the inner cross section of the sleeve 90, and also a second drive connection in the form of a second universal joint 94. The sleeve 90 of the telescoping drive shaft 86 is drivingly coupled to the first angular gear 82 by a first drive connection in the form of a first universal joint 88. The rod 92 of the telescoping drive shaft 88 is drivingly coupled to a second drive connection in the form of a second universal joint 94. The second universal joint 94 is operatively coupled to the input shaft of a second angular gear 96. The transversely extending drive shaft 78 of the header 42 extends through the second angular gear 96. The drive shaft 78 is supported rigidly on the frame 66 of the header 42.

Figure 3:
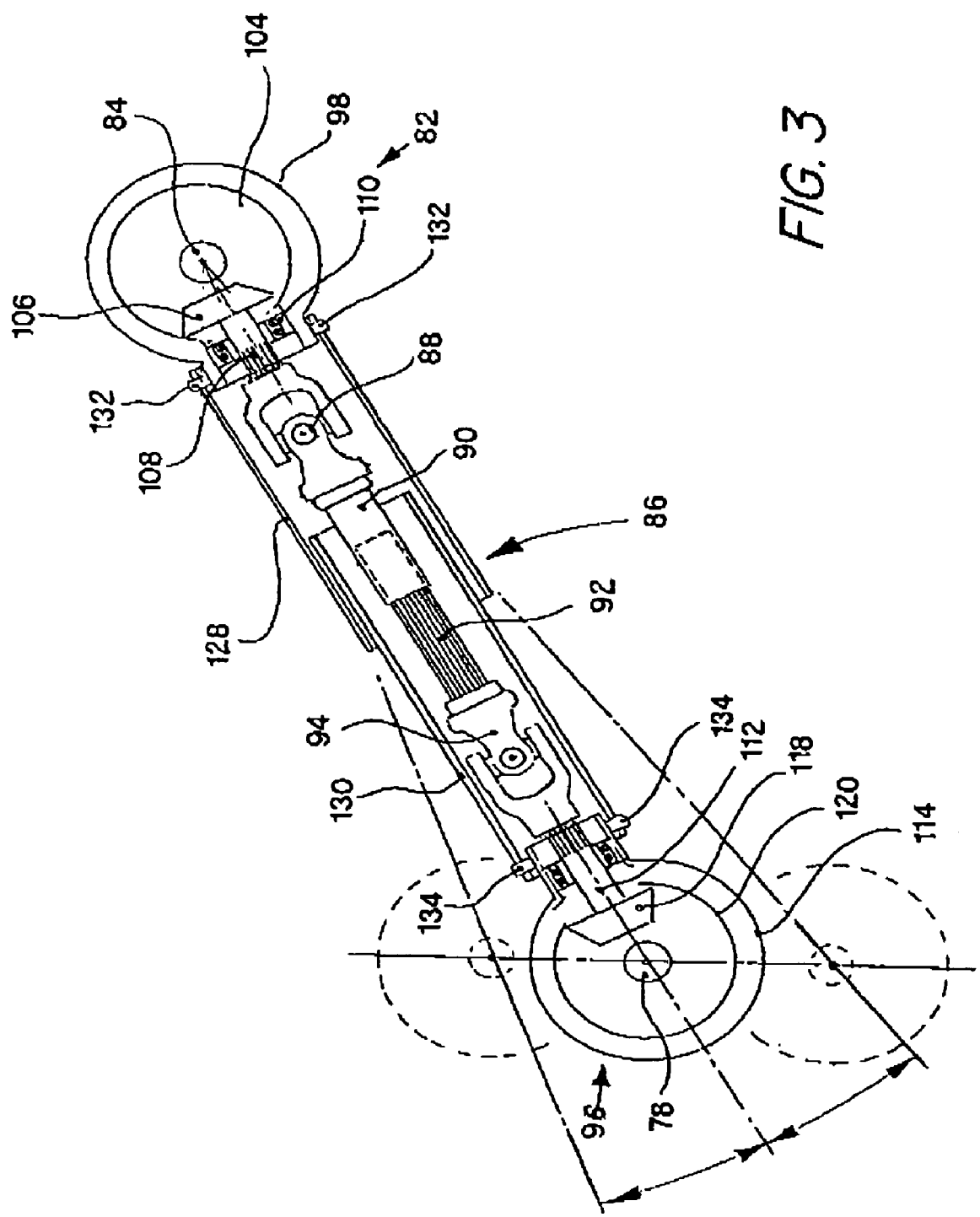
FIG. 3 is a partial cutaway view of the drive train from FIG. 2.
Figure 4:
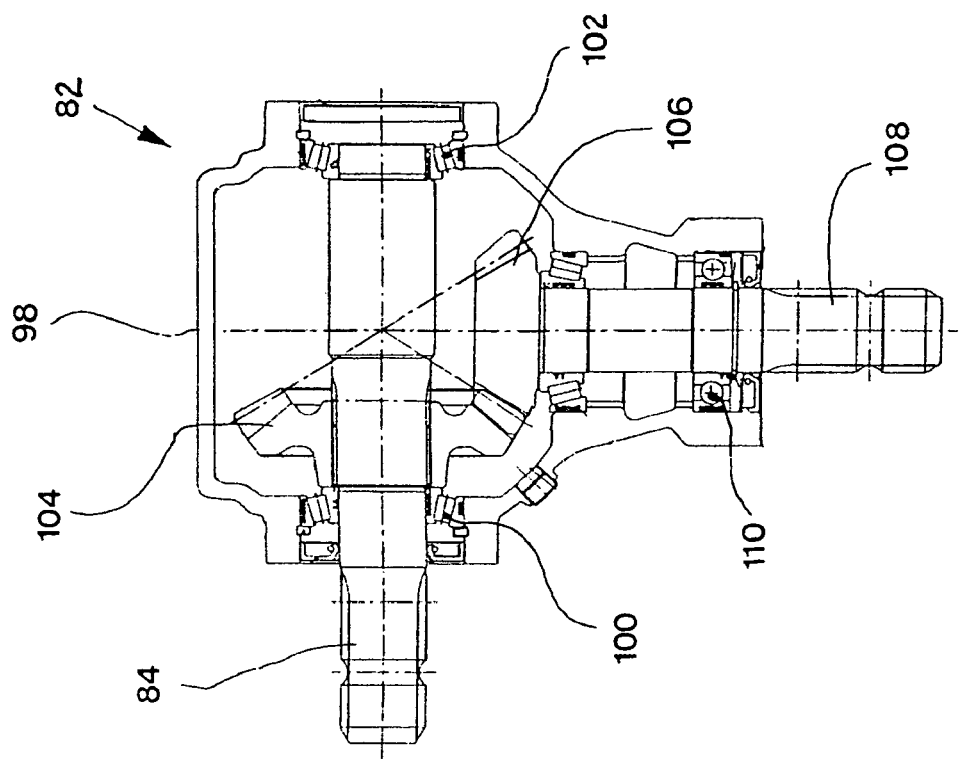
FIG. 4 is a cross sectional view through the first angular gear of the drive train of FIGS. 2 and 3.
Figure 5:
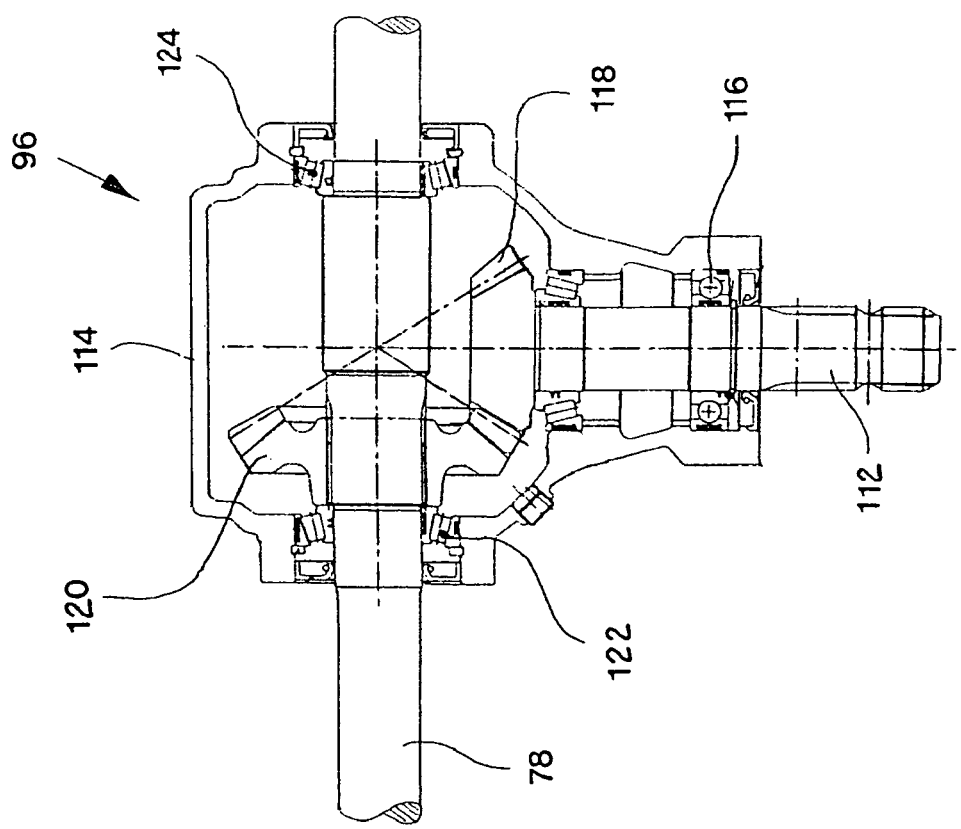
FIG. 5 is a cross sectional view through the second angular gear of the drive train of FIGS. 2 and 3.

The structure and function of the drive train, with the drive shaft 86 and the angular gears 82 and 96, can be inferred from FIGS. 3 and 5. The first shaft 84 extends into the housing 98 of the first angular gear 82. It is supported on the housing 98 (see FIG. 4) by two ball bearings 100 and 102, between which on the first shaft 84 a conical gear wheel 104 is set. The first conical gear wheel 104 engages with a second conical gear wheel 106, which is set on a shaft 108 that is used as a drive element and that is supported on the housing 98 of the first angular gear 82 by a ball bearing 110. The shaft 108 is connected (see FIG. 3) to the input side of the first universal joint 88, whose output side drives the input side of the second universal joint 94 by the sleeve 90 and the rod 92 that are rotationally fixed but can move in the axial direction. The second universal joint is connected at the output side to a shaft 112 provided as a drive element, which extends into a housing 114 (see FIG. 5) of the second angular gear 96, in which it is supported by a ball bearing 116. The shaft 112 is connected at the end with a third conical wheel 118, which engages with a fourth conical wheel 120, which sits on the drive shaft 78 of the header 42. Ball bearings 122 and 124 are located between the housing 114 and the drive shaft 78 on both sides of the fourth conical wheel 120. By means of this structure, the housing 98 of the first angular gear 82 can rotate relative to the first shaft 84 and the housing of the second angular gear 96 can be fixed on the drive shaft 78 so that it can rotate. The housing 98 of the first angular gear 82 is used as a holder for the shaft 108 and the housing 114 of the second angular gear 96 is used as a holder for the shaft 112.

In order to align the shafts 108 and 112 at least approximately parallel to each other, so that the universal joints 88 and 94 need only receive a limited range of angles of the drive shaft 98, there is a connection device in the form of a sleeve between the two housings 98 and 114. The connection device includes a first tube 128 and a second tube 130. The first tube 128 is hinged on the housing 98 of the first angular gear 82 by two pegs 132, which are connected to the housing 98 of the first angular gear 82 and which extend through the corresponding holes at the top, back end of the first tube 128. The pegs 132 extend in a vertical plane and perpendicular to the longitudinal axis of the drive shaft 86 below and above the housing 98 and enable a pivoting of the first tube 128 about their longitudinal axes. Analogously, the second tube 130 is hinged on the housing 114 of the second angular gear 98 by pegs 134, which likewise extend in a vertical plane and perpendicular to the longitudinal axis of the drive shaft 86 under and above the housing 98 and extend through corresponding openings at the bottom, front end of the second tube 130. The second tube 130 has an outer diameter, which is smaller than the inner diameter of the first tube 128, and is pushed into the first tube 128 in the center of the drive shaft 86. The tubes 128 and 130 overlap over a length, which corresponds in the illustrated embodiment approximately to one-fourth of the length of the drive shaft 86. The tubes 128 and 130 have circular cross sections, so that they can rotate about their longitudinal axes relative to each other.

The feeding and picking devices are driven by the internal combustion engine 54 over the first shaft 84, which is driven over a chain or a belt 154 and suitable pinions or pulleys by a top drive shaft 156, which is in drive connection, in turn, with the internal combustion engine 54, usually over a belt drive. The first shaft 84 also drives on the other side of the housing 44 over another chain 158 or a belt, the top feeder house roll 48 and the conveyor chain 50. For driving the first shaft 84, some other drive line from the internal combustion engine 54 could be used.

The drive line to the feeding and picking devices in the header 42 continues from the first shaft 84 over the first angular gear 82, the telescoping drive shaft 86, the second angular gear 96, the drive shaft 78, and the angular gear 80.

During the harvesting operation, the header 42 remains aligned parallel to the ground, because it is supported on skids or is guided by an active system with sensors and actuators (including the hydraulic cylinder 64 as well as another hydraulic cylinder, which pivots the pendulum shield 56 about the pendulum axis 58) at a constant distance or with a defined contact force on the ground, as is known and therefore does not require a more detailed explanation.

The combine 10 is equipped with slope responsive equipment, which acts to adjust the position of the wheels 12 relative to the frame 22, such that the frame 22 always remains level. Thus, if the combine 10 harvests along a slope, the wheels 12 on the higher side of the slope are moved upwards and the wheels 12 on the lower side of the slope are moved downwards relative to the frame 22. The swinging, suspended rear wheels 14 must follow these movements. Simultaneously, the pendulum shield 56 swings with the attached header 42 about the pendulum axis 58, as indicated by the arrow 136 in FIG. 2. Here, the second angular gear 96 moves with the header 42, because it is fixed by ball bearings 122 and 124 to the drive shaft 78. In contrast, the first angular gear 82 is connected by ball bearings 100 and 102 to the first shaft 84, which is supported, in turn, on the housing 44 of the feeder house 38. The movement of the second angular gear 96 relative to the first angular gear 82 is enabled by the drive shaft 86, which can telescope and which is equipped with the two universal joints 88 and 94.

Due to the pivoting motion of the header 42 about the pendulum axis 58, the second angular gear 96 moves during sloped operation relative to the first angular gear 82 on a circular path about the pendulum axis 58. The connection device acts with the tubes 128 and 130, such that the shafts 108 and 112 remain aligned parallel, because the housings 98 and 114 are supported on the associated shafts 84 and 78 so they cannot move in the axial direction of the shafts 84 and 78 but can rotate relative to the shafts 84 and 78. Because the second angular gear 96 moves on a circular path, the connection device not only must allow a change in distance between the angular gears 82 and 96, which is guaranteed by the ability of the tubes 128 and 130 to telescope, but also must allow a rotation of the angular gears 82 and 96. For this purpose, the tubes 128 and 130 can rotate relative to each other. The illustrated and described orientation of the pegs 132 and 134 enables the movement of the second angular gear 96 relative to the first angular gear 82 in the horizontal direction perpendicular to the direction of travel (i.e., to the left and right), which is likewise limited by the movement of the second angular gear 96 on a circular path.

Through the connection device with the tubes 128 and 130, it is achieved that the shafts 108 and 112 always remain aligned parallel. The universal joints 88, 94 need only equalize the lateral movement of the second angular gear 96, which is significantly smaller than the vertical movement, which is made clear in FIG. 3 by the dashed positions of the second angular gear 96. This eliminates the use of wide angle joints in the drive shaft 86. The connection device also provides the drive shaft 86 with protection against environmental effects. In addition, a production of different variant headers 42 for combines 10 with or without slope equipment is unnecessary, because the drive shaft 78 can be connected to the illustrated and described drive connection between the first shaft 84 and the drive shaft 78 also with a shaft corresponding to the first shaft 84 on a combine without slope equipment. In this case, the described drive train can be replaced by a conventional drive shaft that can telescope or that is rigid.

With reference to FIG. 2, it can be further recognized that the header 42 is assembled from a center part 138 and two side parts 140 and 142, which can swing upwards and inwards for transport on a road, as indicated by arrow 144. The side parts 140 and 142 have drive shafts 146, which can be coupled by coupling halves 148 and 150 to the drive shaft 78 of the center part 138. When the side parts 140 and 142 are swung into the transport position, the coupling halves 148 and 150 automatically separate and they reconnect in a driving connection when the side parts 140 and 142 are swung down again for harvesting operation.

The embodiment of the drive train of the header 42 shown in FIG. 2 enables the side parts 140 and 142 to swing into the transport position, also for a header 42 suitable for use on a combine 10 with slope equipment, without requiring the separation of the drive connection between the first shaft 84 and the drive shaft 78 of the header 42. The operator thus need not come down from the driver cabin 16 in order to release the drive connection, which significantly accelerates the transition between the harvesting and transport positions of the header 42.

In FIG. 2, the drive train of a header 42 according to the prior art is also shown with dashed lines. It includes the connection, which projects from the first shaft 84 and which is also used by the present drive train, and is connected to the outer side of the side part 142 by a drive shaft that can telescope with a connection 152. The drive shaft that can telescope is necessary to allow pendulum movement of the header 42 about the pendulum axis 58. Thus, in the state of the art, the drive shaft must be removed, which is made unnecessary by the invention.

Having described the illustrated embodiment, it will become apparent that various modifications can be made without departing from the scope of the invention as defined in the accompanying claims.

The invention claimed is:

1. A drive train for a header of a harvesting machine having a plurality of harvesting devices, the harvesting machine having a direction of travel, the drive train comprising a variable length drive shaft having a first end, a second end and a longitudinal axis, the first end has a first hinged drive connection, the first hinged drive connection is driven by a drive element having a first shaft and the second end has a second hinged connection, the second hinged connection is operatively coupled to a secondary drive shaft by a driven element, the secondary drive shaft drives the plurality of harvesting devices of the header, characterized by the fact that the drive train is provided with means for aligning the drive element and the driven element at least approximately parallel to each other; the drive element being supported in a first holder so that it can rotate, the first holder being supported so that it can pivot about an axis perpendicular to the longitudinal axis of the variable length drive shaft and a second holder being supported so that it can pivot about a parallel axis to the longitudinal axis of the variable length drive shaft; the driven element being supported in the second holder so that it can rotate, and the first holder and the second holder being coupled to each other by a connection device that can change in length, the connection device being connected to the first holder and the second holder about a pivot axis that is perpendicular to the longitudinal axis of the drive shaft and perpendicular to the pivot axis of the holders.

2. The drive train as defined by claim 1 wherein the connection device allows the first holder to rotate relative to the second holder about the longitudinal axis of the variable length drive shaft.

3. The drive train as defined by claim 2 wherein the connection device is a sleeve enclosing the variable length drive shaft, the sleeve comprising a first part, which is coupled to the first holder, and a second part, which is coupled to the second holder, wherein the first part and the second part are supported so that they can telescope and rotate relative to each other.

4. The drive train as defined by claim 1 wherein the first shaft is attached to a front side of a feeder house of the harvesting machine.

5. The drive train as defined by claim 1 wherein the axis of rotation of the first shaft extends horizontal and perpendicular to the direction of travel of the harvesting machine.

6. The drive train as defined by claim 1 wherein the axis of rotation of the secondary drive shaft extends horizontal and perpendicular to the direction of travel.

7. The drive train as defined by claim 1 wherein the variable length drive shaft extends in the direction of travel.

8. The drive train as defined by claim 1 wherein the variable length drive shaft is a telescoping drive shaft.

9. The drive train as defined by claim 1 wherein the first hinged connection and the second hinged connection are universal joints.

* * * * *